(No Model.) 2 Sheets—Sheet 2.

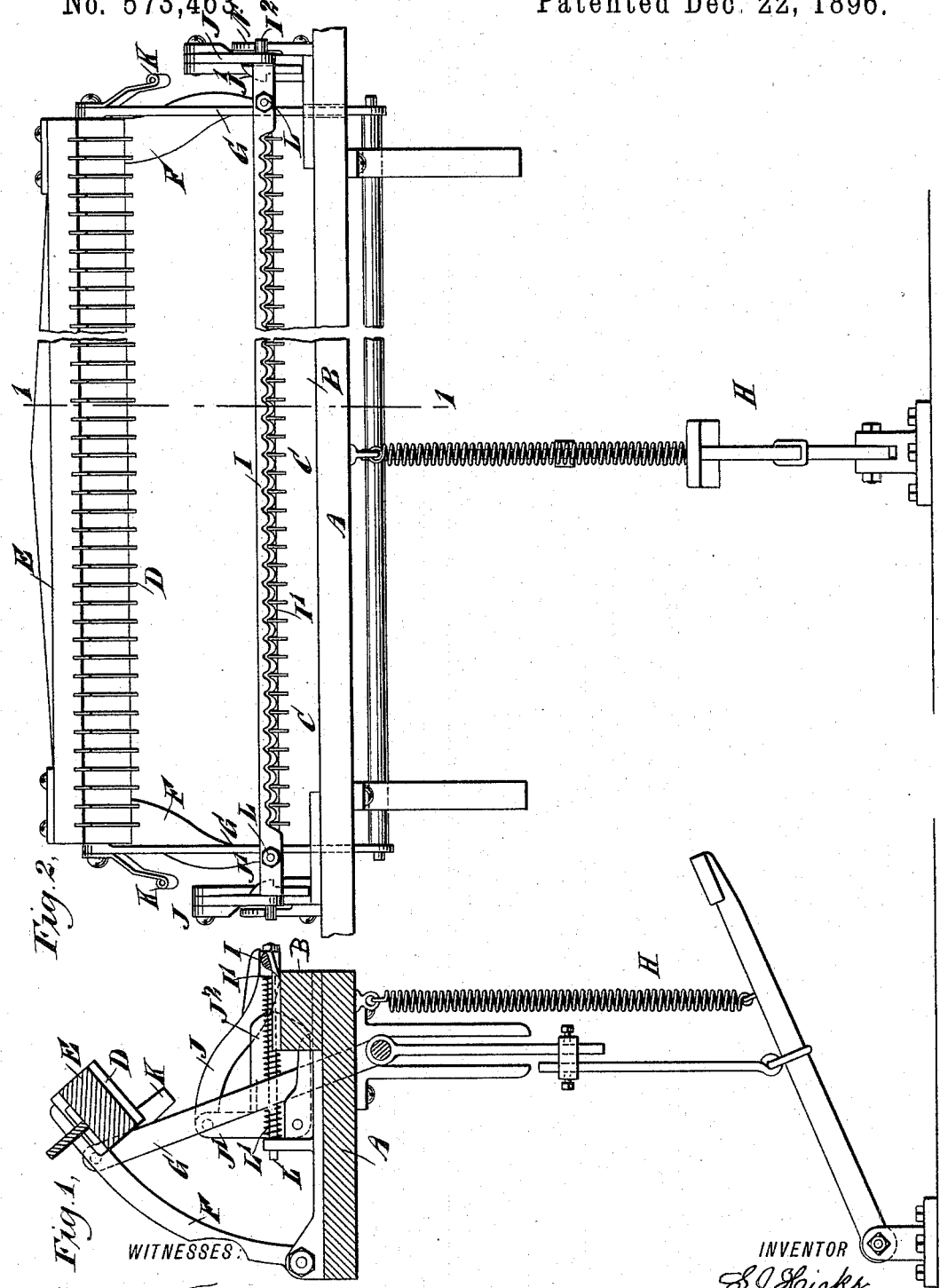

S. J. HICKS.
CONFECTIONERY MACHINE.

No. 573,463. Patented Dec. 22, 1896.

WITNESSES:
Edward Thorpe
Theo. G. Hoster

INVENTOR
S. J. Hicks
BY
Munn
ATTORNEYS.

UNITED STATES PATENT OFFICE.

SIMEON J. HICKS, OF CHICAGO, ILLINOIS.

CONFECTIONERY-MACHINE.

SPECIFICATION forming part of Letters Patent No. 573,463, dated December 22, 1896.

Application filed February 12, 1896. Serial No. 578,973. (No model.)

*To all whom it may concern:*

Be it known that I, SIMEON J. HICKS, of Chicago, in the county of Cook and State of Illinois, have invented certain new and useful Improvements in Confectionery-Machines, of which the following is a full, clear, and exact description.

The invention relates to confectionery-machines such as shown and described in the Letters Patent of the United States, No. 531,033, granted to me December 18, 1894.

The object of the present invention is to provide a new and improved confectionery-machine arranged to readily cut a drawn and flattened piece of candy or like substance into small pieces and to readily remove the cut pieces from the knife.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 4:
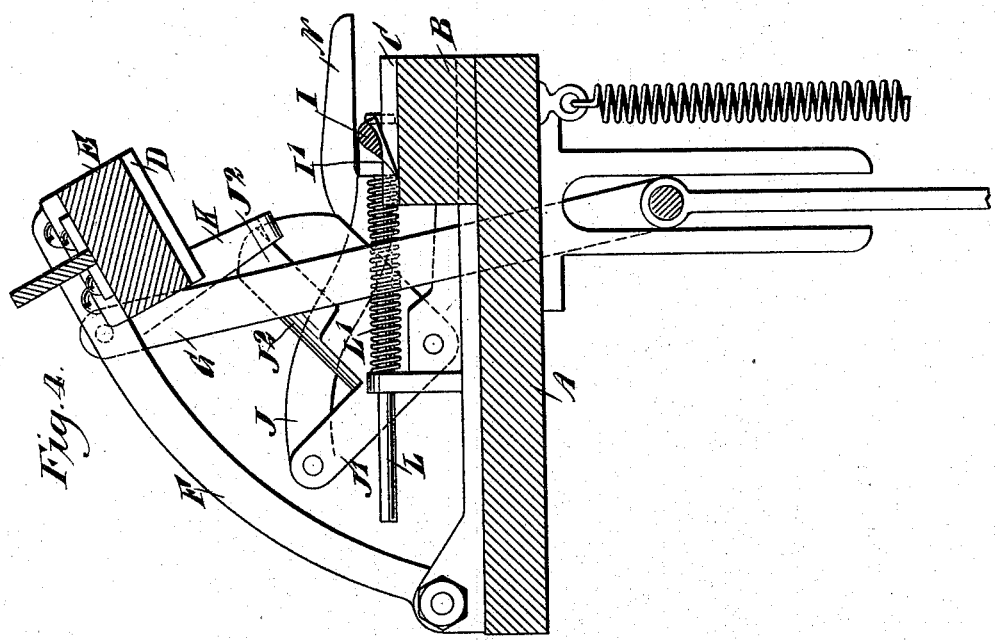
Figure 3:
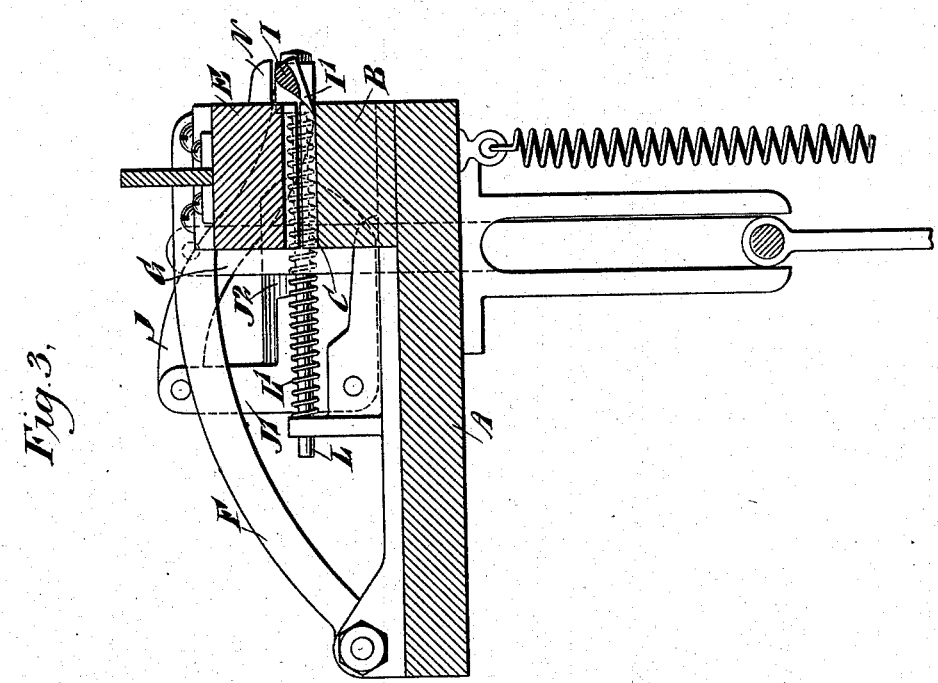

Figure 1 is a transverse section of the improvement on the line 1 1 of Fig. 2. Fig. 2 is a front elevation of the same. Fig. 3 is an enlarged cross-section of the improvement, showing the knives closed; and Fig. 4 is a similar view of the same with the knives open.

The improved machine is provided with a suitably-constructed table A, on the front end of which is arranged a longitudinally-extending knife-plate B, carrying transversely-arranged knives C, projecting a suitable distance above the plate B and placed a suitable distance apart, according to the size of the pieces to be formed. The knives C operate in conjunction with the knives D, secured on the under side of a movable knife-frame E, having rearwardly-extending arms F, fulcrumed on the rear of the table A and connected by links G with a treadle mechanism H, similar to the one described in detail in the patent above referred to, so that further description of the same is not deemed necessary.

Over the stationary knives C operates a laterally-reciprocating comb I, formed with downwardly and rearwardly extending teeth I', passing between adjacent knives C, so that the pieces cut by the knives D and C are removed from between the fixed knives after the knives D commence to move upward, so that the cut pieces of candy or like substance are delivered at the rear of the table A.

The comb I is pivotally connected by links J with bell-crank levers J', formed at their forward ends with wedge-shaped projections J², adapted to be engaged by spring-catches K, secured to the movable knife-frame E at the links G, so that said catches on the upward-swinging motion of the movable frame E cause a rearward tilting of the bell-crank levers J' to cause the links J to draw the comb I rearwardly and push off the cut pieces, as previously explained. When the movable frame E moves into its uppermost position, the free ends of the catches K are disengaged from the wedge-shaped projections J², so that the comb I is returned to its normal position at the front end of the stationary knife-plate B, as indicated in Fig. 3, and in order to insure a rapid return movement of this comb I provide the same with rearwardly-extending rods L, fitted to slide in suitable bearings and carrying coil-springs L', which are compressed during the rearwardly-reciprocating motion of the comb, so that when the spring-catches K leave the projections J² the said springs L' in expanding return the comb I to a front position.

It is understood that when the machine is in use the movable knife-frame E is normally in an uppermost position, as illustrated in Fig. 1, owing to the spring acting on the treadle, as described in the patent referred to. While the parts are in this position the operator places a piece of drawn candy or like substance over the projecting fixed knives C, then actuates the treadle mechanism H to cause the frame E to swing downward and cut the candy, after which the operator releases the treadle to permit the frame E to swing in an upward direction and move the comb I laterally over the fixed knives C to push with their teeth I' the pieces of cut candy from the knives C and plate B upon the rear of the table A.

It is understood that the spring-catches K in their downward movement readily pass over the beveled sides of the projections J² to catch the base thereof, so as to tilt the bell-crank levers J' rearwardly on the next upward movement of the frame E, as previously explained.

Having thus fully described my invention, I claim as new and desire to secure by Letters Patent—

1. In a confectionery-machine, the combination with horizontally-arranged fixed knives, and movable knives above the fixed knives, of a comb extending across the fixed knives and having its teeth projecting between the said knives, and means for reciprocating the comb over the fixed knives on the return movement of the movable knives, substantially as described.

2. In a confectionery-machine, the combination with fixed and movable knives, of a reciprocating comb having its teeth projecting between the fixed knives, and means for reciprocating the comb horizontally over the fixed knives, said means being controlled by the movable knives, substantially as described.

3. In a confectionery-machine, the combination with fixed and movable knives, of a spring-pressed comb having its teeth projecting between the fixed knives, and a connection between the comb and the movable knives to operate the former from the latter, substantially as described.

4. In a confectionery-machine, the combination with fixed knives and movable knives adapted to swing toward and from said fixed knives, of a comb adapted to reciprocate laterally over said fixed knives and extending with its prongs between said fixed knives, means for actuating said comb from said movable knives, to cause the comb to move rearwardly, and springs for returning said comb to a forward normal position, substantially as shown and described.

5. In a confectionery-machine, the combination with fixed knives, and movable knives fitted to swing toward and from the fixed knives, of a spring-pressed comb having its teeth projecting between the fixed knives, bell-crank levers, links connecting the comb with the said levers, and means for tilting the bell-crank levers from the movable knives, substantially as described.

6. In a confectionery-machine, the combination with fixed knives, and movable knives fitted to swing toward and from the fixed knives, of a comb having its teeth projecting between the fixed knives and provided with rearwardly-extending rods, springs surrounding the rods for normally holding the comb in its forward position, bell-crank levers having wedge-shaped projections, links connecting the bell-crank levers with the comb, and catches on the movable knives for engaging the projections of the bell-crank levers, substantially as described.

SIMEON J. HICKS.

Witnesses:
  H. C. DEGENER,
  A. E. SMITH.